(12) United States Patent
Ekl et al.

(10) Patent No.: US 8,832,797 B2
(45) Date of Patent: Sep. 9, 2014

(54) METHOD AND SYSTEM FOR ENSURING AUTHORIZED OPERATION OF A COMMUNICATION SYSTEM AS A SECONDARY USER

(75) Inventors: Randy L. Ekl, Lake Zurich, IL (US); Anthony R. Metke, Naperville, IL (US); Bruce D. Oberlies, Cary, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1069 days.

(21) Appl. No.: 12/394,561

(22) Filed: Feb. 27, 2009

(65) Prior Publication Data

US 2010/0223659 A1    Sep. 2, 2010

(51) Int. Cl.

| | |
|---|---|
| *H04L 9/00* | (2006.01) |
| *H04W 28/18* | (2009.01) |
| *H04W 12/06* | (2009.01) |
| *H04W 52/36* | (2009.01) |
| *H04L 29/06* | (2006.01) |
| *H04W 16/14* | (2009.01) |

(52) U.S. Cl.
CPC ........... *H04W 12/06* (2013.01); *H04L 63/0823* (2013.01); *H04W 28/18* (2013.01); *H04W 16/14* (2013.01); *H04W 52/367* (2013.01)
USPC .................................................. 726/4; 726/3

(58) Field of Classification Search
CPC ... H04W 12/06; H04W 52/367; H04W 28/18; H04W 16/14; H04L 63/0823
USPC .............. 726/9, 26, 27, 28, 29; 713/224, 201, 713/212, 213, 220, 223; 709/204, 201, 220, 709/227; 707/600, 607, 608, 609, 687, 821; 380/200, 201, 202, 293, 227

See application file for complete search history.

(56) References Cited

U.S. PATENT DOCUMENTS

| 7,042,867 | B2 | 5/2006 | Whitehill et al. |
|---|---|---|---|
| 2006/0083205 | A1 | 4/2006 | Buddhikot et al. |
| 2007/0087682 | A1 | 4/2007 | DaCosta |
| 2008/0104242 | A1 | 5/2008 | Zavalkovsky et al. |
| 2008/0117836 | A1 | 5/2008 | Savoor et al. |
| 2008/0182592 | A1 | 7/2008 | Cha et al. |
| 2008/0222021 | A1 * | 9/2008 | Stanforth et al. ............... 705/37 |
| 2010/0124331 | A1 * | 5/2010 | Park et al. ..................... 380/268 |

FOREIGN PATENT DOCUMENTS

| WO | 2008109641 A1 | 9/2008 |
|---|---|---|
| WO | 2010014314 A1 | 2/2010 |

OTHER PUBLICATIONS

International Search Report and Written Opinion for International Application No. PCT/US2010/024399 mailed on Sep. 30, 2010.

(Continued)

*Primary Examiner* — Kambiz Zand
*Assistant Examiner* — Nega Woldemariam
(74) *Attorney, Agent, or Firm* — Barbara R. Doutre

(57) ABSTRACT

A communication system (100) is facilitated by an access node (102) to support communication with subscriber units (104, 106) as secondary users of a regulated spectrum portion. The access node requests permission to operate as a secondary user from an authorization server (118). The authorization server provides authorized transmission parameters based on characteristics of the access node. The access node operates according to the authorized transmission parameters and provides the parameters to eligible subscriber units.

22 Claims, 3 Drawing Sheets

(56) References Cited

OTHER PUBLICATIONS

International Preliminary Report on Patentability for International Application No. PCT/US2010/024399 mailed on Aug. 30, 2011.
Counterpart European Application No. 10746645.0—EPC Search Report mailed Sep. 5, 2013.
Konstantinos V. Katsaros, et al.: Design Challenges of Open Spectrum Access, Personal, Indoor and Mobile Radio Communications, 2008. PIMRC 2008. IEEE 19th International Symposium on, IEEE, Piscataway, NJ USA dated Sep. 15, 2008, pp. 1-5.
IEEE: Dynamic Multi-Level Power Control:, IEEE DRAFT, IEEE, Piscataway, NJ USA, Nov. 4, 2005.

* cited by examiner

METHOD AND SYSTEM FOR ENSURING AUTHORIZED OPERATION OF A COMMUNICATION SYSTEM AS A SECONDARY USER

FIELD OF THE INVENTION

The invention relates generally to wireless communication systems, and more particularly to wireless communication systems that operate as secondary users in a spectrum portion otherwise reserved for other primary communication operators.

BACKGROUND OF THE INVENTION

As wireless communication becomes more prevalent, there is a corresponding need to ensure clear spectrum that may be used by communication operators without infringing on other communication operators. For example, there is a need for additional channel capacity for public safety radio in many metropolitan regions. One proposal being examined is to allow secondary use of unused television broadcast channels for other radio communication. Still another proposal would allow secondary operators to aggregate narrowband channels into a wider channel for secondary usage. A secondary user is an operator that is allowed to use an unused spectrum portion or channel that would otherwise be reserved for other, usually licensed primary users. Secondary users may be unlicensed or "lightly" licensed. In order to ensure that secondary users do not interfere with primary user communications, it has been proposed that a database be maintained which allows secondary users to determine or receive an indication as to which primary user channels are presently available in the geographic vicinity of the secondary user's operation. Furthermore, it is contemplated that there may be different tiers of secondary users, where the general public may be allowed one level of operation and commercial and public safety users, who have had proper training in radio operation, are allowed an enhanced level of operation. Accordingly, there is a need to ensure that operators seeking an enhanced level of operation as a secondary user are appropriately regulated.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention. Those skilled in the art will be familiar with radio communications and the terms and phrases used in association with the applicable known standards, such as, for example, IEEE specifications 802.11 and 802.16, as well as the Project 25 (P25) standard of the Telecommunications Industry Association and the various cellular telephony standards.

The invention solves the problem of ensuring a communication system operating in a secondary use mode use appropriate transmission parameters by requiring the communication system to request operating parameters from an authority. An access node initially contacts an authorization server, providing its location and credentials. The authorization server maintains a database of primary users, their operating areas, and operating channels. Upon receiving the access node request from the access node, the authorization server determines which channels are available based on where the access node is located, and provides that information to the access node along with other operating parameters such as transmission power. The exchange may be secured by using public key signing of the exchanges to ensure authentication of the requesting entity. The response from the authorization server may be in the form of a certificate specific to the requesting access node, and which may only be decrypted by the requesting access node via public key cryptographic techniques. Upon receiving the authorized transmission parameters from the authorization server, the access node may then issue the authorized transmission parameters to subscriber units associating with the access node. The access node may prevent unauthorized operation of subscriber units by not issuing the authorized transmission parameters, or not issuing all of the authorized transmission parameters if the subscriber unit does not present sufficient credentials, in which case the subscriber unit may operate at a default level. It is contemplated that the default level may be that the subscriber unit is not allowed to transmit.

Figure 1:
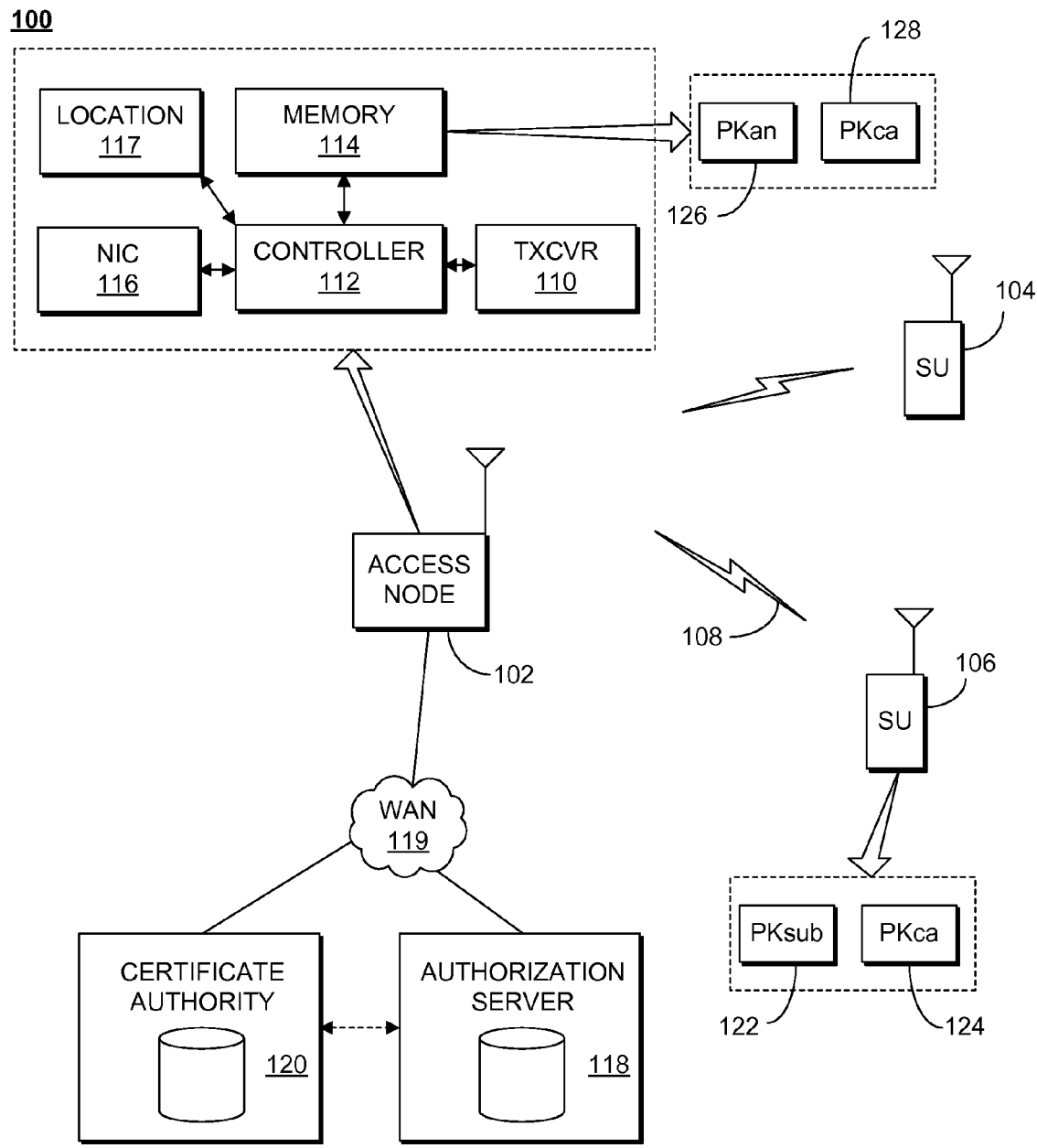
FIG. 1 shows a system diagram of a secondary use communication system in accordance with an embodiment of the invention.

Referring to FIG. 1, there is shown a system diagram of a secondary use communication system 100 in accordance with an embodiment of the invention. Central to the communication system is an access node 102 which provides a radio air interface in the vicinity of the access node. The access node may be used to facilitate a wide variety of communication activity. For example, the access node may be realized as an access point for a wireless local area network, or may be a wide area radio base station for a public safety radio system, among other configurations, as those skilled in the art will appreciate. Subscriber units such as subscriber units 104 and 106 associate with access node via radio links 108 for communication service.

The access node is typically connected to a communication infrastructure to relay communication between subscriber units associated with the access node and other entities located remotely from the access node. To facilitate the air interface, the access node includes a transceiver 110 which further includes radio components to transmit and receive radio signals, as well as circuitry for frequency generation, modulation and demodulation, amplification, filtering, and so on. The transceiver is operably coupled to a controller 112.

The controller is primarily responsible for the overall operation of the access node. The various components of the access node may themselves have microprocessors to carry out their function, and controlled or otherwise directed by the controller 112. The controller is operably coupled to a memory 114, which, among others, contains instruction code which, upon being executed by the controller, causes the access node to perform operations in accordance with the teaching of the invention as described herein. The memory as shown here is generalized and includes all forms of computer readable storage medium required for operation, including read only memory, random access memory, reprogrammable non-volatile memory, bulk storage such hard disk drives, and so on. Various data, operating parameters, and instruction code may be stored in various locations in the memory, and execution space may be provided by the memory. In order to facilitate communication to remote entities, the access node may further include a network interface controller (NIC) 116. Several different NICs may be used to connect to different networks, such as a communication infrastructure, the Internet, local area networks, and so on. In addition, the access node may be provided with a location determination means 117, such as a global positioning system (GPS) satellite receiver. The location of the access node is important since the access node will be operating as a secondary user in a spectrum region otherwise reserved for some primary operator, and use of the spectrum is therefore regulated.

To obtain authorization to operate as a secondary user, the access node contacts an authorization server 118 over a network 119. The authorization server maintains a database of primary operators, the geographic location where they are operating, and the spectrum portions or channels they use. Primary operators are licensed by the applicable governmental regulatory agency and any interfering signal sources are subject to penalties. However, there are typically portions or channels of spectrum reserved for primary operators, such as television broadcasters, that are not being used in a given region. Secondary users, such as the access node 102 of communication system 100 may request permission to operate in these unused spectrum regions. In making a request, the access node may include its location, which is used by the authorization server to determine which channels are presently available for secondary use operation. The authorization server responds to the request with authorized transmission parameters, which may include the channel or spectrum portion to be used by the access node, as well as a transmit power level and other interface parameters such as choice of protocol, quality of service, system loading, and so on. For example, the authorization server may specify whether contention-based access is to be used, whether the requester may use a proprietary or a standard protocol, as well as if there is a load limit imposed on the requestor restricting operating time if the requester is not allowed to use 100% of the airtime. Upon receiving the authorized transmission parameters, the access node configures the transceiver 110 accordingly, and requires any subscriber units associating with the access node to comply.

In order to assure the authorization server that the access node is operated by an appropriate entity, the access node may securely transmit the request in a manner that the request may be authenticated, such as by using an access node public key (PKan) 126, to sign the request. The request may further include a digital certificate for which the access node is the subject, issued by a certificate authority 120 that is trusted by the authorization server. Both the access node public key and certificate authority public key (PKca) 128 may be stored in the memory 114 of the access node. The response may likewise include a certificate that may be authenticated by the access node using a public key of the certificate authority. The authorization parameters may have a validation period associated with them and upon expiration of the validation period, the access node must reauthorize to continue operation. Furthermore, the authorized transmission parameters are only applicable to the location of the access node as provided in the request. If the access node is moved beyond a predetermined threshold, it must reauthorize and receive permission and parameters to operate in the new location. The access node may be designed to enforce compliant operation such as by providing certain security and cryptographic information such as the digital certificate issued by the certificate authority 120, and the public and private keys used by the access node for authenticated communication in a tamper resistant or tamper proof memory of the access node.

Similarly, to ensure authentic operation of subscriber units, each subscriber unit may be provided its own public key 122 and a copy of the public key of the certificate authority 124. These may be stored in tamper resistant or tamper proof memory of the subscriber unit. To enable enhanced operating parameters, the subscriber unit may, upon associating with the access node, transmit a service upgrade request to operate at an enhanced operating level, in accordance with the authorized transmission parameters provided by the authorization server. After the access node authenticates the service upgrade request, it responds with the authorized transmission parameters, which may be in the form of a certificate issued by the certificate authority in an encrypted form, which the subscriber unit may decrypt or otherwise authenticate using the public key of the certificate authority.

Figure 2:
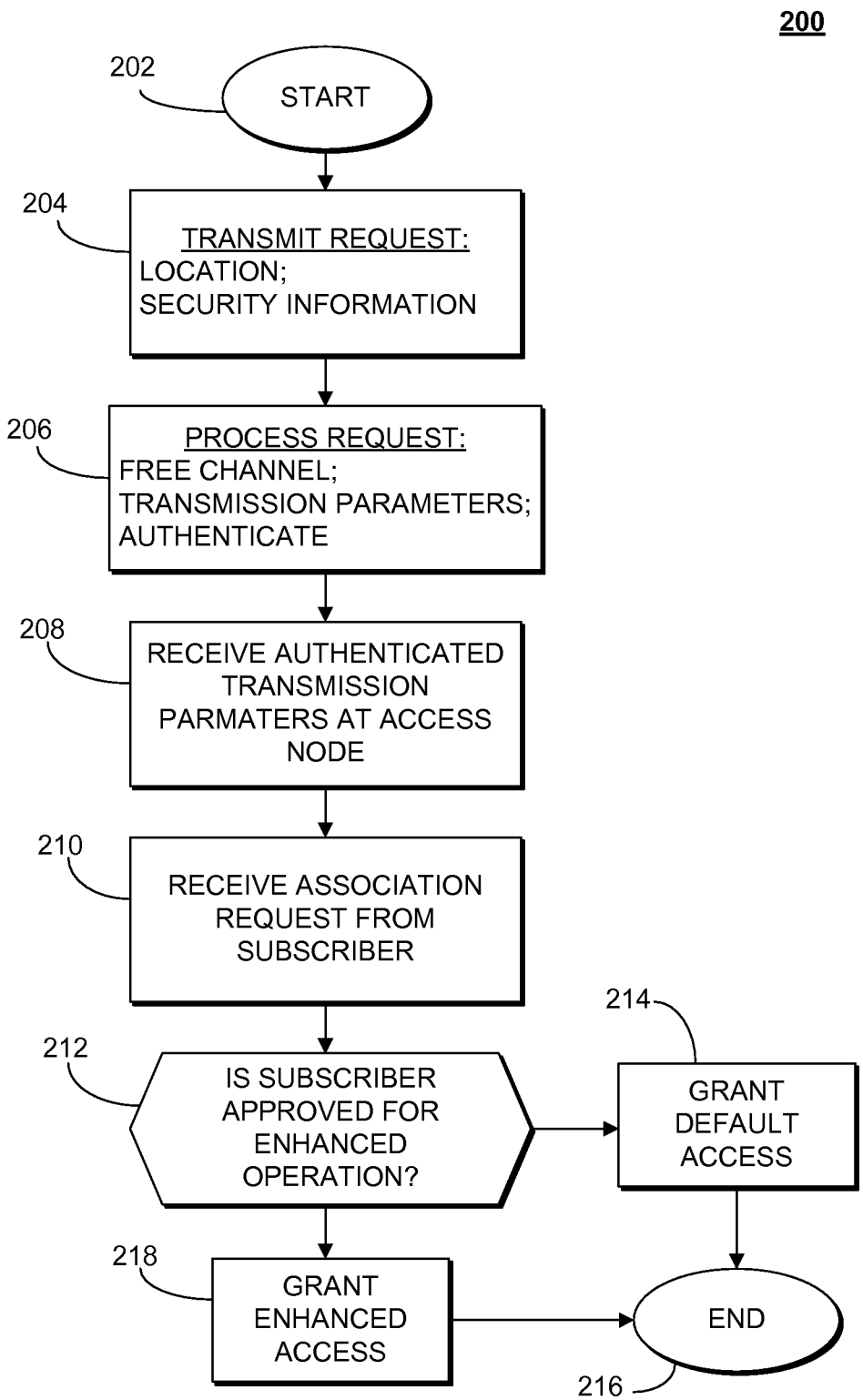
FIG. 2 shows a flow chart diagram of an overview of a method for regulating transmission characteristics of wireless communication system operating in a secondary use mode, in accordance with an embodiment of the invention.

FIG. 2 shows a flow chart diagram of an overview of a method 200 for regulating transmission characteristics of wireless communication system operating in a secondary use mode form the perspective of an access node, in accordance with an embodiment of the invention. The access node may be provided with instruction code in a computer readable storage medium which is executed by the controller of the access node, and causes the access node and constituent components to substantially perform the processes illustrated and described here. At the start 202, the access node is powered up but does not have the authorized transmission parameters. Accordingly, the access node transmits a request 204 to the authorization server. The request includes, in the present embodiment, the location of the access node, and security information for authenticating the access node. The authorization server receives the request and commences processing the request 206. The authorization server may first authenticate the request, and then determine appropriate transmission parameters based on the location of the access node. For example, the authorization server may compare the location of the access node with the location of primary use transmitters in the area of the access node, and determine which channel are available, and what power level may be used. The authorization server may then pass the public key of the access node to the certificate authority for certificate generation. The authorization server then transmits the authorized transmission parameters to the access node, secured by the certificate. The access node, upon receiving the authorized transmission parameters 208 may authenticate them using the public key of the certificate authority, and then configure the transceiver accordingly. The access node also stores the authorized transmission parameters in memory so as to deliver them to subscriber units upon associating with the access node.

Once the access node has the authorized transmission parameters, it may commence communication activity as a secondary user in the prescribed channel or spectrum portion. The access node may then receive an association request from a subscriber unit (210). The access node may determine (212) whether the particular subscriber unit is eligible for enhanced operation using the authorized transmission parameters, or if a default mode should be used. If the subscriber unit is eligible for enhanced operation, the access node may grant enhanced operation 218, but if not, then default operation may be granted 214, and the method is terminated 218 until it needs to be repeated. It should be noted that the enhanced level of operation, using the authorized transmission parameters, is a higher level of operation than the default level, such as having a higher transmission power level. Alternatively, the access node may respond to the association request with the authorized transmission parameters in a certificate which can only be opened by subscriber units having the public key of the certificate authority, and which have been properly approved or authenticated. It is contemplated that the users of the subscriber units may be subject to verification, such as prompting for a password which may be authenticated or verified to ensure the user is approved to operate the subscriber unit using the authorized transmission parameters.

Figure 3:
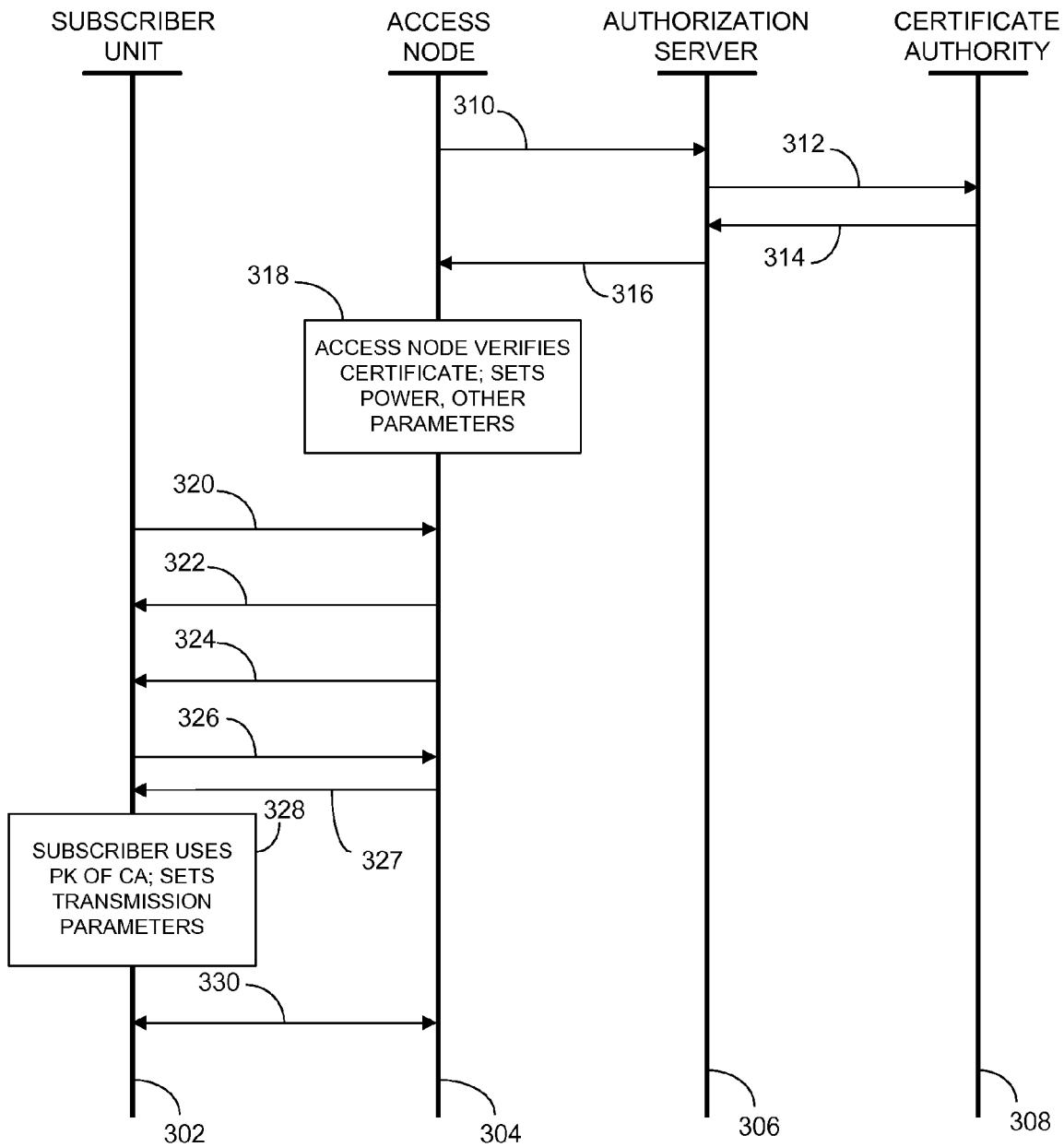
FIG. 3 is a signal flow chart for operating a wireless communication system in a secondary use mode, in accordance with an embodiment of the invention.

FIG. 3 is a signal flow chart 300 for operating a wireless communication system in a secondary use mode, in accordance with an embodiment of the invention. The chart shows signal flow between the subscriber unit 302 and the access node 304, and between the access node and the authorization server 306 and certificate authority 308. The access node first transmits a request 310 to the authorization server, requesting secondary use approval. The access node request may be an authenticatable request so that the authorization server can verify the identity of the access node. The request is authenticatable by, for example, containing a time stamp or Nonce value, and it may reference the identity of the requesting access node which is bound to a public key via a trusted certificate. The request may also be signed with the public key. The request may include the location of the access node, the name or identifier of the access node and security information such as a public key. The authorization server may then verify or authenticate the access node and request, determine the authorized transmission parameters, including channel or spectrum portion to be used, as well as other parameters such as transmission power, choice of protocol, and so on. The authorization server may be operated by a governmental entity, such as the Federal Communication Commission, or another entity acting in accordance with applicable regulations. Upon determining that the requesting access node is eligible for secondary use operation, and/or enhanced operation, the authorization server may transit a request 312 to the certificate authority. The request may include, for example, the public key of the access node and the authorized transmission parameters, which the certificate authority uses to generate a certificate using the private key of the certificate authority, which is then transmitted back to the authorization server (314). The authorization server then transmits the secured authorized transmission parameters back to the access node (316). The authorized transmission parameters include the frequencies frequency bands, or channels in which the access node may operate, and may included additional parameters such as augmented transmission power level limit usable by the subscriber units and access node which is a higher power level than a default transmission power level limit used by the subscriber units. Furthermore, the authorized transmission parameters may define a transmission operating regime to be used by the access node which describes aspects of the air interface, such as protocol, quality of service level, and so on. At that point, the access node can extract the authorized transmission parameters 318, verify the certificate, and configure the access node transceiver accordingly. The access node also retains the authorized transmission parameters to dispense to subscriber units.

Subsequently a subscriber unit then requests association with the access node (320), and an association commences 322. The association may be similar to the association that occurs between an access node and subscriber units in systems operated in accordance with IEEE specification 802.11, for example. A subsequent authentication process may then occur. The authentication process may be similar to the authentication that occurs between an access node and subscriber units in systems operated in accordance with IEEE specification 802.11i, for example. To engage in enhanced or augmented operation, during authentication the subscriber unit transmits to the access node a digital certificate issued by a certificate authority associated with the authorization server to allow the access node to authenticate the subscriber unit. Alternatively, the subscriber unit may authenticate itself to the access node without the digital certificate, in which case the access node may grant only a default association. The access node may also transmit the authorized transmission parameters 324 to the associating subscriber, for example in the form of a certificate. The subscriber unit may then request a signature 326 from the access node to open or access the authorized transmission parameters. This request for a signature may include a nonce value. The access node then provides the signature (327). The signature is calculated over data which may include the identity of the access node, the nonce value, a time-stamp, and any specific transmission parameters that the access node wishes to the assign to the subscriber. The subscriber unit then commences a process 328 using the public key of a certificate authority trusted by the authorization server to authenticate the transmission parameters, and then configure its own transceiver accordingly. Thereupon the subscriber unit may commence communication activity 330 via the access node.

This invention can be embodied in other forms without departing from the spirit or essential attributes thereof. Accordingly, reference should be made to the following claims, rather than to the foregoing specification, as indicating the scope of the invention.

What is claimed is:

1. A method for obtaining transmission permission in a regulated spectrum, comprising:
    transmitting, from an access node to an authorization server, a request for authorized transmission parameters, the request indentifying the access node and including a location of the access node wherein, the request is signed with a digital certificate that is issued by a certificate authority associated with the authorization server;
    receiving from the authorization server at the access node the authorized transmission parameters, wherein the authorized transmission parameters are based at least in part on the location of the access node and known licensed users in the location of the access node, and are specific to the access node, and wherein the access node then operates in accordance with the transmission parameters;
    receiving an association request from a subscriber unit at the access node; and
    transmitting from the access node an association approval to the subscriber unit, including the authorized transmission parameters, wherein the subscriber unit commences communication activity using the authorized transmission parameters.

2. The method of claim 1, wherein transmitting the request comprises transmitting an authenticatable request.

3. The method of claim 1, wherein the transmission parameters are by the authorization server with a digital certificate issued by the certificate authority associated with the authorization server.

4. The method of claim 1, wherein the digital certificate is stored in the access node in a non-modifiable memory.

5. The method of claim 1, wherein receiving the transmission parameters further comprises receiving a digital certificate to authenticate the transmission parameters.

6. The method of claim 1 wherein transmitting the request comprises transmitting a request to operate as a secondary user of a reserved spectrum band.

7. The method of claim 6, wherein the reserved spectrum band is reserved for television broadcast, and wherein the authorized transmission parameters includes an indication of open television channels that may be used by the access node and associated subscriber units.

8. The method of claim 1, wherein the authorized transmission parameters include an augmented transmission power limit that is higher than a default power limit, wherein the access node and subscriber unit use the augmented transmission power limit to transmit at a power level higher that the default power limit.

9. The method of claim 1 wherein receiving the association request comprises receiving a digital certificate from the subscriber unit, the digital certificate being issued by a certificate authority associated with the authorization server.

10. The method of claim 9, wherein the association approval is signed by the access node with a certificate issued by the certificate authority associated with the authorization server.

11. A wireless communication access node, comprising:
a transceiver for receiving and transmitting radio signals;
a memory including a non-modifiable portion having a digital certificate stored within the non-modifiable portion;
a controller operably coupled to the transceiver and memory which executes instruction code stored in the memory which configures the access node to:
transmit, from the access node to an authorization server, an authenticable request for authorized transmission parameters, wherein the request identifies the access node and includes a location of the access node and is signed with the digital certificate, wherein the digital certificate issued by a certificate authority associated with the authorization server;
receive from the authorization server at the access node the authorized transmission parameters, wherein the authorized transmission parameters are based at least in part on the location of the access node, and wherein the access node then operates in accordance with the transmission parameters;
receive an association request via the transceiver from a subscriber unit at the access node; and
transmit an association approval to the subscriber unit, including the authorized transmission parameters, wherein the subscriber unit commences communication activity with the access node according to the authorized transmission parameters.

12. The access node of claim 11, wherein the transmission parameters are signed by the authorization server with a digital certificate issued by the certificate authority.

13. The access node of claim 11, wherein the request includes a request to operate as a secondary user of a reserved spectrum band.

14. The access node of claim 13, wherein the reserved spectrum band is reserved for television broadcast, and wherein the authorized transmission parameters include an indication of open television channels that may be used by the access node and associated subscriber units.

15. The access node of claim 11, wherein the authorized transmission parameters include an augmented transmission power limit that is higher than a default power limit, wherein the access node and subscriber unit use the augmented transmission power limit to transmit at a power level higher that the default power limit.

16. The access node of claim 11 wherein the association request is signed by the subscriber unit with a digital certificate issued by the certificate authority.

17. The access node of claim 16, wherein the association approval is signed by the access node with a certificate issued by the certificate authority.

18. A method of ensuring authorized operation of subscriber units in a communication system as secondary users of a reserved spectrum portion, comprising:
obtaining, at an access node of the communication system, authenticated transmission parameters from an authorization server, wherein the transmission parameters define a transmission operating regime to be used by the communication system in the reserved spectrum portion;
requesting association by a subscriber unit to the access node;
transmitting a digital certificate including the transmission parameters by the access node to the subscriber unit while granting the requested association;
authenticating the transmission parameters by the subscriber unit using a public key of the certification authority trusted by the authorization server; and
configuring the transceiver of the subscriber unit in accordance with the authenticated transmission parameters.

19. The method of claim 18, wherein the reserved spectrum portion is a television spectrum portion, obtaining the authenticated transmission parameters includes submitting a location of the access node to the authorization server and receiving in the authenticated transmission parameters an identification of a vacant television channel in which the communication system is to operate.

20. The method of claim 18, wherein obtaining the authenticated transmission parameters comprises transmitting a request for the authenticated transmission parameters from the access node to the authorization server, and wherein the request includes a public key of the access node and a public key of the certificate authority, and wherein the public key of the certificate authority is stored in a non-modifiable memory of the access node.

21. The method of claim 18, further comprising:
requesting, by the subscriber unit, a signature of the access node after receiving the transmission parameters from the access node; and
prior to authenticating, accessing the transmission parameters using the signature of the access node by the subscriber unit.

22. The method of claim 18, wherein requesting association by the subscriber unit comprises transmitting an association request including a digital certificate issued by a certificate authority associated with the authorization server.

* * * * *

UNITED STATES PATENT AND TRADEMARK OFFICE
CERTIFICATE OF CORRECTION

| | | |
|---|---|---|
| PATENT NO. | : 8,832,797 B2 | Page 1 of 1 |
| APPLICATION NO. | : 12/394561 | |
| DATED | : September 9, 2014 | |
| INVENTOR(S) | : Randy L. Ekl et al. | |

It is certified that error appears in the above-identified patent and that said Letters Patent is hereby corrected as shown below:

IN THE DRAWINGS:

In FIG. 2, Sheet 2 of 3, for Tag "208", in Line 3, delete "PARMATERS" and insert -- PARAMETERS --, therefor.

IN THE SPECIFICATION:

In Column 3, Line 50, delete "requester" and insert -- requestor --, therefor.

In Column 3, Line 53, delete "requester" and insert -- requestor --, therefor.

In Column 4, Line 35, delete "form the" and insert -- from the --, therefor.

In Column 5, Line 9, delete "218 until" and insert -- 216 until --, therefor.

IN THE CLAIMS:

In Column 7, Line 4, in Claim 3, delete "are by" and insert -- are signed by --, therefor.

In Column 7, Line 25, in Claim 8, delete "higher that the" and insert -- higher than the --, therefor.

In Column 8, Line 12, in Claim 15, delete "higher that the" and insert -- higher than the --, therefor.

Signed and Sealed this
Twenty-fourth Day of May, 2016

Michelle K. Lee
*Director of the United States Patent and Trademark Office*